May 30, 1950     E. L. KRIEG     2,509,358
AUTOMATIC THROTTLE CONTROL SYSTEM
Filed May 17, 1946
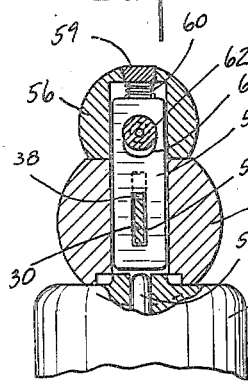
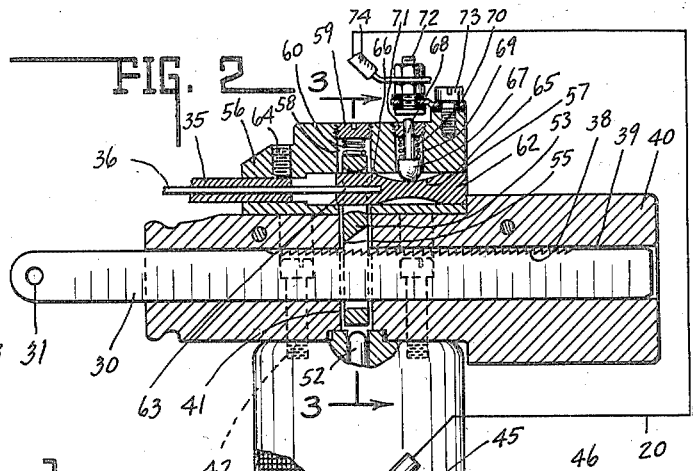
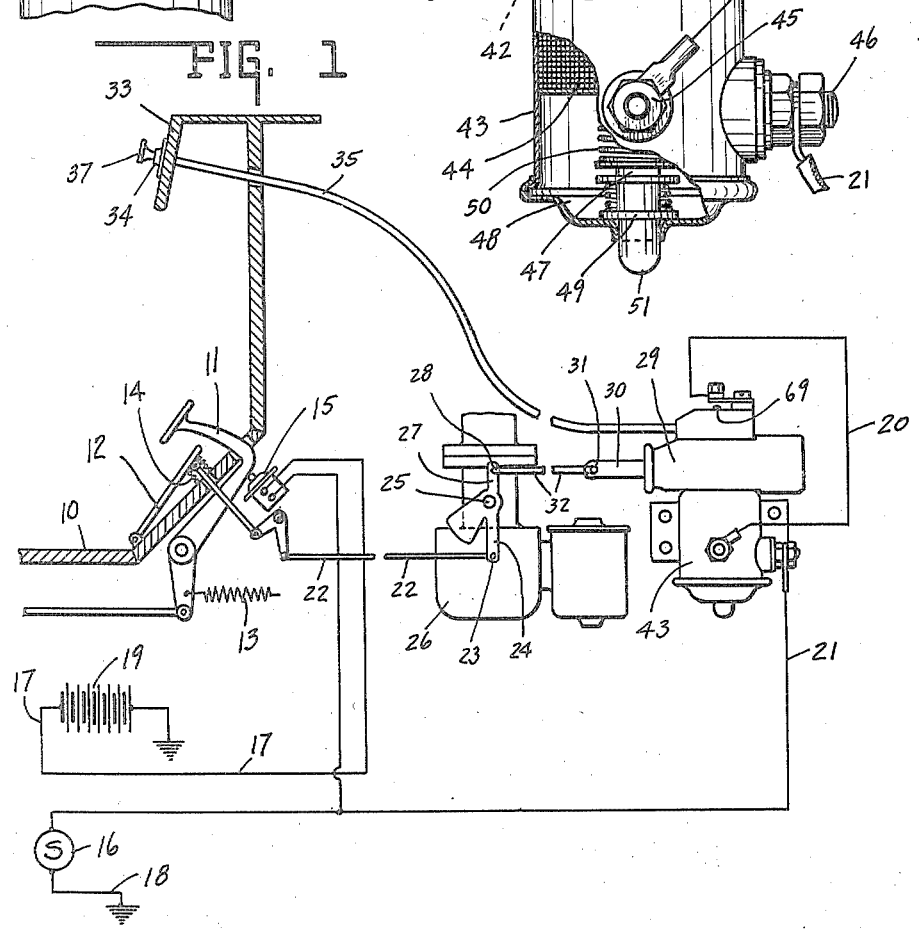
INVENTOR.
ELDON L. KRIEG.
BY Lockwood, Goldsmith & Galt
ATTORNEYS.

Patented May 30, 1950

2,509,358

UNITED STATES PATENT OFFICE 2,509,358

AUTOMATIC THROTTLE CONTROL SYSTEM

Eldon L. Krieg, South Whitley, Ind.

Application May 17, 1946, Serial No. 670,600

3 Claims. (Cl. 192—3)

This invention relates to a throttle control for self propelled vehicles.

The chief object of this invention is to permit an operator or driver of such vehicle to lock the fuel control in the manually adjusted position thereby relieving foot and leg strain on long driving runs and by means which are fool-proof, simple and positive.

Another chief object of this invention is to effect lock release through the braking system broadly whereby the foot, usually utilized for both throttle and brake control, is always available, when the lock is effective, for simultaneous lock release and brake application thereby expediting brake application.

A further object of this invention is to provide a lock that permits throttle advance or increased acceleration as desired but prevents retrograde or deceleration action and which lock, when actuated for release permits the conventional throttle to return to low-idle operating position.

The chief feature of the present invention, as suggested hereinbefore, resides in the simple, compact, positive means that can be applied as an attachment to any conventional throttle and brake system of a vehicle without undue or excessive parts, labor or cost.

Other objects and features of the invention will be set forth more fully hereinafter.

The full nature of the invention will be understood from the accompanying drawings and the following description and claims.

In the drawings, Fig. 1 is a semi-diagrammatic and sectional view of a portion of a self-propelled vehicle with the invention incorporated therein, same being shown in elevation.

Fig. 2 is an enlarged longitudinal sectional view of the one-way lock and its electrical release mechanism.

Fig. 3 is an enlarged transverse sectional view of the parts shown in Fig. 2 and is taken on line 3—3 of Fig. 2 and in the direction of the arrows.

In Fig. 1 of the drawings, 10 indicates the toe board through which projects brake pedal 11 and throttle pedal or accelerator 12, each being normally constrained in the conventional manner to the elevated position. Herein such means are illustrated as springs 13 and 14 respectively.

Associated with the brake pedal is the usual brake applying mechanism not shown. Associated with the brake pedal or a brake pedal actuated part is a normally open switch 15 that is closed upon initial depression of the brake pedal and remains closed during the entire interval the brake pedal is initially depressed and while it is depressed to any greater degree.

This switch controls a so-called stop light circuit including stop light 16, wires 17 and 18 and the source of energy 19, a storage battery, carried by the vehicle or some other source as commonly employed.

It is well known that slight foot pressure on the brake pedal energizes the stop light. Herein lines 20 and 21 are in multiple with the stop light, so whenever it is energized by closing switch 15, lines 20 and 21 also are connected to the source. If desired, line 17 may include switch 15 and lines 18 and 20 may be grounded and also one terminal of the battery may be grounded.

It will be recalled that there is projecting through the toe board 10 into the driver's compartment the accelerator pedal 12, constrained by spring 14 to the low idle position.

This pedal is suitably connected by various types of linkages and the like to a rod 22 directed toward the engine, and same in turn is pivotally connected at 23 to the throttle lever 24 carried by throttle shaft 25 of a carburetor structure indicated generally by the numeral 26 supplying the engine, not shown, with fuel.

This lever on a conventional carburetor usually includes arm 27. This lever normally is apertured at 28. The throttle control lock and release mechanism generally is indicated in Fig. 1 by the numeral 29, and projecting therefrom is a bar having an eye portion 31.

A link 32 is of U-shaped character and has one arm seated in the aperture 28 and the other arm seated in the eye 31. Cotter keys or like locks may be associated therewith.

In other words, the arm 30 is mechanically and directly connected to the lever 24 and responds directly to the rod 22 and the accelerator pedal 12.

Mounted on the dash 33, see Fig. 1, is an anchoring fixture 34 that projects forwardly therefrom by means of a flexible conduit 35 in which is mounted a flexible but comparatively stiff wire 36, the latter projecting through the fixture 34 and terminating in a control knob 37 at the dash.

This constitutes the manual control for imposing the lock upon the throttle system.

Reference will now be had more particularly to Figs. 2 and 3. It will be noted that the bar 30 is provided with a series of rack arranged ratchet teeth 38 and herein on the upper face thereof. This bar slides through a longitudinally extending slot or bore 39 in a body portion 40. This body portion slot is of sufficient size to maintain the bar 30 in its proper position and permit of its free reciprocation in opposite directions.

The body portion 40 includes a transverse bore 44 therethrough that intersects bore 39. Rigid with body 40 as at 42 is casing 43 in which is mounted a solenoid 44 having terminals 45 and 46 to which reference will be had hereinafter. A reciprocable core or plunger 47 is slidably supported within and by the solenoid and includes in chamber 48 a collar portion 49.

Either casing 43 or body 40 may be stationarily mounted.

A spring 50 bears at one end on the solenoid and at the other end on said collar and normally constrains the plunger core to lowered position (assisted by gravity). The extreme end 51 is also normally exposed beyond the casing 43 so that it may be finger engaged for emergency purposes only and as hereinafter pointed out.

Plunger 47 registers with transverse bore 41 and carries a pin portion 52 that is movable upwardly into that bore. A vertically reciprocable locking plate 53 is provided. Same is slidable in transverse bore 41. This plate is provided with an elongated slot 54 slightly wider than bar 30 and somewhat longer than the depth of bar 30.

The upper edge of this slot has a tooth formation 55 and same relative to rack teeth 38 permits free movement of rod 30 to the left (toward full throttle) at all times but prevents retrograde or reverse movement of bar 30 from the last adjusted position thereof toward the right, or low idle position.

Release is effected by energizing solenoid 44 to elevate plunger 47 and pin 52 to lift locking plate 53 so that tooth 55 is now positioned above the plane of teeth 38 on said bar 30. When this is effected, the throttle or accelerator is released to its constraint, to-wit, the diagrammatic representation of spring 14 and the construction immediately moves to the low idle position.

It will be obvious, by reason of the inclination of the teeth 38 and the cooperating tooth 55 on the locking plate, that the throttle system will be held as determined by the depression of the foot pedal 12 and that as long as that pedal has not been depressed to the full or wide open throttle position, the operator can further depress the pedal successively for increased speeds.

Thus if the operator has set the throttle system at, say 40 miles an hour, and in an emergency requires an acceleration of 50 or 55 miles an hour, it can immediately be attained in the usual manner by depressing further the foot pedal.

Now if the operator requires a quick slow down following such increased acceleration, all that is required is to momentarily actuate the brake pedal and, through means more fully to be set forth, the solenoid is immediately energized and the rack bar 30 is released and immediately returns to low idle.

In the event even greater deceleration is required than that mentioned by the last operation, the operator will further depress the brake pedal to actually apply the brakes to the desired degree. Thus it will be clear that complete control of the vehicle through acceleration and deceleration can be had at all times.

Suitably secured to or formed integral with the body portion 40 is a head structure 56. It has a bore 57 therethrough parallel to the bore 39. Plate 53 is of such a length that its upper portion is movable transverse to bore 58 in the transverse bore 58, and the same may be closed by a removable plug structure 59 at its upper end.

This transverse bore 58 registers with the transverse bore 41 and interposed between the plug or closer 59 and the top of the plate 53 is a spring 60. This spring 60 normally tends to depress the plate 53 downward or into tooth locking engagement with the toothed rack bar 30 for holding same in the adjusted throttle position.

Of course, the force enforced on the core or plunger 47 by energization of the solenoid 44 is sufficient to overcome both springs 50 and 60 since both, together with gravity, act on the locking plate and plunger, all as aforesaid. The locking plate 53 has a hole 61 therethrough and this hole is adapted to register fully or partially, as hereinafter set forth, with the transverse bore 57.

Slidable in the bore 57 is a cam member 62. This is essentially dumbbell shaped and it has connected to its left hand end, as indicated at 63, the other end of the wire 36 which mounts the knob 37 exposed on the dash 33.

A locking screw, or set screw 64, also secured the other end of the flexible tubing or conduit 35 in the bore 57. The result is a Bowden wire control for the dumbbell shaped member 62.

Since it is of that shape, it will be noted that the central portion is relieved as at 65, and when that portion is registered with the transverse bore 58, the spring 60, as well as gravity, is effective to depress the locking plate and maintain the same such that the locking tooth 55 engages the rack teeth 38 to hold the throttle system in the adjusted position.

Now this is only effected when the knob 37 is pulled out. When, however, the knob 37 is pushed in, the enlargement 66 adjacent the relieved portion 65 engages the upper face of the plate hole 61, which may be rounded as shown, and thus the locking plate can be manually elevated to move the locking tooth 55 into a position above the plane of the teeth 38 of the locking bar 30 so the throttle system is lock free.

The other end of the dumbbell shaped member is herein shown associated with a ball 67 that carries a stem 68 that normally projects upwardly as at 69 beyond the portion 56. Surrounding the stem and providing a chamber for ball reception is the relieved or chambered portion 69 in which is mounted spring 70, the same bearing on the ball at its lower end and on the closure 71 at its upper end, thus forcing the ball downwardly at all times.

Now when the knob 37 is pulled out on the dash it will be obvious that the ball 67 is forced upwardly and its stem is forced upwardly in opposition to the spring 70. When, however, the knob is pushed in, the dumbbell member is moved to the right. The relieved portion 65 thereof then registers with the ball 67 and the spring 70 normally partially projects the ball downwardly and into the bore 57, such being permitted by the relief portion 65 of the dumbbell member.

Thus the stem 68 aforesaid has reciprocatory movement in accordance with the reciprocatory movement but transverse to and incident to the movement in and out of the knob 37.

Juxtapositioned to the exposed end of the stem 68 is a switch contact member 72, and it is mounted in insulated relation and is carried by the body portion 56 as at 73. It has a wire 74 therefrom that connects to the terminal 45 aforesaid of the solenoid 44.

Now this stem 68 may be grounded or it may carry in insulated relation a contact that would be connected to the line 20. Terminal 46 of the solenoid is connected to line 21, previously described as being in multiple with line 17, including the switch 15, which is the stop light operating or controlling switch operable in the usual manner by brake pedal contact or the initial movement thereof.

Thus whenever the brake pedal is engaged the circuit will be closed to the stop light through the switch 15 and at the same time current will be supplied in the present form of the invention directly to the solenoid 44 provided the control has been imposed upon the device by pulling outward the knob 37 at the dash, for at that time and at all times that the knob 37 is pulled out, the switch, including the ball and stem actuator, is in closed circuit position.

When, however, the control is not to be imposed, the knob is pushed in and the last mentioned switch is opened and therefore the circuit, in multiple with the stop light, is deenergized regardless of whether the stop light circuit is energized or not.

As previously set forth, whenever the knob is pushed in the spring 60 is opposed by the dumbbell shaped actuator holding the locking plate elevated.

Now at this time the plunger 47 still remains in the lowered position and thus there will be a gap between the stem 52 and the bottom of the locking plate. When, however, the locking plate is released to its constraint, the aforementioned spring 60, tooth 55 engages rack teeth 38 and plate 53 drops into contact with plunger stem 52.

When the solenoid 44 is energized both springs associated with that plate and the plunger are overpowered by the force of the solenoid and the imposed lock released. It was previously indicated that there was an emergency control provided.

Now it can well be assumed that under certain accidental conditions the stop light circuit may fail, not, for example, by reason of the failure of the stop light bulb but by reason of faulty wiring. If that be true, the operator will readily discover such condition and even if something simultaneously happened to the knob 37 or the wire 36 became disengaged from the dumbbell shaped member, nevertheless the end 51 of the plunger can be elevated to release the locking plate 30 from any imposed adjusted control and the dumbbell shaped member can be moved so that it will thereafter hold the plate 53 in the elevated position, either by moving the wire, as previously stated, or by inserting an instrument into the end of the bore 57. The dumbbell shaped member 62 provides cams 66 at opposite ends with the relief portion 65 therebetween.

The exposure of the ball on the ball stem switch member is such, however, that it can not be fully dropped into the bore 58 by spring 60 when the dumbbell member is so moved to the left for emergency purposes.

When, however, the parts are so actuated the throttle system is free of the lock control so that the driver can proceed as if no lock were attached.

Note that as long as knob 37 is pulled out, regardless of the number of solenoid releases, the lock is immediately and repetitiously effective for acceleration holding purposes by pedal 12 depression to the desired degree. Obviously since hand and foot throttles are equivalents as well as operable in multiple, the disclosed control will be equally effective upon either or both if same are of the automatic return to low idle type when released.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A throttle lock for a complete conventional throttle system comprising in combination body means including substantially parallel channels therein, a member reciprocable in one channel and responsive to throttle movement, a bore in the body means transverse to both channels and communicating with both channels, a locking member reciprocable in the bore, means normally constraining the locking member to have uni-directional locking association with the first mentioned member, a manually operable member in the second channel for selectively conditioning the locking member for locking and non-locking association with the first member, electrically operable means for moving said locking member in opposition to its constraint and to non-locking position, and a manually operable switch for energizing said last mentioned means to effect unlocking.

2. A throttle lock as defined by claim 1 wherein normally open switch means is provided in series with the electrically operable means, and means is associated with the said switch means and automatically operable in manual movement of the second channel member for closing said switch means when the last mentioned member is moved to member locking conditioning position.

3. A throttle lock for a vehicle having a conventional throttle system normally constrained to low idle position and a conventional brake system with an electrically energized portion upon brake application, said lock comprising a member normally movable in corresponding relation to and by the throttle system, a locking member for the first member, means normally constraining the locking member to lock the first member against other than throttle advance, a manually operable member arranged to condition the locking member for locking operation and decondition the locking member for release, electrically operable means for releasing the locking member from the first member and its opposition to the constraint imposed upon the locking member, and switch means in series with the last mentioned means for conditioning a circuit thereto for energization of said electrically operable means and operable by the manually operable member, the electrically operable means being controlled by the electrically energized portion of the brake system upon brake actuation.

ELDON L. KRIEG.

REFERENCES CITED

The following references are of record in the file of this patent:

UNITED STATES PATENTS

| Number | Name | Date |
|---|---|---|
| 2,034,253 | Shelley | Mar. 17, 1936 |
| 2,076,460 | Heinrich | Apr. 6, 1937 |
| 2,159,772 | Schroeder | May 23, 1939 |
| 2,167,843 | Johnson | Aug. 1, 1939 |
| 2,261,502 | Major | Nov. 4, 1941 |
| 2,270,002 | Glick | Jan. 13, 1942 |
| 2,284,380 | Drabble | May 26, 1942 |
| 2,313,000 | Hauguel | Mar. 2, 1943 |